(12) United States Patent
Wiatrowski et al.

(10) Patent No.: US 8,023,973 B2
(45) Date of Patent: Sep. 20, 2011

(54) EXPANDABLE TEXT MESSAGING SERVICE PROTOCOL FOR USE WITH A TWO-WAY RADIO TRANSCEIVER

(75) Inventors: David G. Wiatrowski, Woodstock, IL (US); Mohammed A. Foustok, Coral Springs, FL (US); Stephen C. Glass, Plantation, FL (US); Kevin M. Ittner, Chicago, IL (US); Timothy A. Auch, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 829 days.

(21) Appl. No.: 11/619,489

(22) Filed: Jan. 3, 2007

(65) Prior Publication Data

US 2008/0161026 A1    Jul. 3, 2008

(51) Int. Cl.
*H04W 4/00* (2009.01)
(52) U.S. Cl. ...... 455/466; 455/400; 455/403; 455/422.1
(58) Field of Classification Search ............... 345/186.2; 455/412, 466, 403, 400, 422.1; 710/105; 398/147; 709/230, 227
See application file for complete search history.

(56) References Cited

U.S. PATENT DOCUMENTS

| | | | | | |
|---|---|---|---|---|---|
| 5,309,433 | A | * | 5/1994 | Cidon et al. | 370/390 |
| 6,014,380 | A | * | 1/2000 | Hendel et al. | 370/392 |
| 6,144,653 | A | * | 11/2000 | Persson et al. | 370/337 |
| 6,222,857 | B1 | | 4/2001 | Kammer | |
| 6,377,808 | B1 | | 4/2002 | Korneluk | |
| 6,598,034 | B1 | * | 7/2003 | Kloth | 706/47 |
| 6,606,486 | B1 | * | 8/2003 | Cubbage et al. | 455/186.2 |
| 6,754,709 | B1 | | 6/2004 | Gbadegesin | |
| 7,043,233 | B2 | * | 5/2006 | Hasegawa | 455/412.2 |
| 7,079,524 | B2 | * | 7/2006 | Bantukul et al. | 370/349 |
| 7,092,729 | B1 | * | 8/2006 | Fichet et al. | 455/466 |
| 7,587,039 | B1 | * | 9/2009 | Koch | 379/211.01 |
| 2002/0001314 | A1 | | 1/2002 | Yi | |
| 2002/0093527 | A1 | * | 7/2002 | Sherlock et al. | 345/736 |
| 2002/0120760 | A1 | * | 8/2002 | Kimchi et al. | 709/230 |
| 2002/0144156 | A1 | | 10/2002 | Copeland | |
| 2002/0174276 | A1 | * | 11/2002 | Jiang | 710/105 |
| 2003/0223363 | A1 | * | 12/2003 | Sato | 370/230 |
| 2004/0023676 | A1 | | 2/2004 | Lee | |
| 2004/0128665 | A1 | | 7/2004 | Gouleau | |
| 2004/0203614 | A1 | * | 10/2004 | Qu et al. | 455/412.1 |
| 2004/0215976 | A1 | | 10/2004 | Jain | |
| 2005/0091360 | A1 | | 4/2005 | Chen | |
| 2005/0135814 | A1 | * | 6/2005 | Courtney | 398/147 |

(Continued)

OTHER PUBLICATIONS

RS Watcher: A Port Scanning Detector by Rebecca Cao Shelton, Apr. 23, 1999.*

(Continued)

*Primary Examiner* — Kent Chang
*Assistant Examiner* — Ronald Eisner
(74) *Attorney, Agent, or Firm* — Valerie M. Davis

(57) ABSTRACT

An expandable text messaging service protocol for use with a two-way radio transceiver includes an extension bit field for creating an expandable header for controlling the overall size of data packets used for communicating message traffic. The protocol further includes a control bit field for designing the message as a control message or user message and a protocol data unit (PDU) type field for identifying the message type. A payload field may further be used for carrying message content.

20 Claims, 11 Drawing Sheets

U.S. PATENT DOCUMENTS

| | | | |
|---|---|---|---|
| 2006/0036551 A1* | 2/2006 | Oliveira et al. | 705/51 |
| 2006/0098586 A1* | 5/2006 | Farrell et al. | 370/254 |
| 2006/0248369 A1* | 11/2006 | Kumazawa et al. | 714/4 |
| 2007/0026878 A1* | 2/2007 | Midkiff et al. | 455/466 |
| 2007/0177514 A1* | 8/2007 | Harrington et al. | 370/241 |
| 2008/0292101 A1* | 11/2008 | Macchi | 380/270 |
| 2010/0279646 A1* | 11/2010 | Thiebaut et al. | 455/404.1 |

OTHER PUBLICATIONS

PCT Search Report Dated Mar. 17, 2008.

PCT Preliminary Report on Patentability Dated Jul. 16, 2009.

* cited by examiner

EXPANDABLE TEXT MESSAGING SERVICE PROTOCOL FOR USE WITH A TWO-WAY RADIO TRANSCEIVER

TECHNICAL FIELD

The present invention relates generally to electronic text messaging service protocols and, more particularly, to text messaging service protocols used with a two-way radio transceiver and other devices using the transceiver as a modem.

BACKGROUND

Many differing types of data messaging protocols are known in the art. A communication protocol is a set of standard rules for data representation, signaling, authentication, and error detection required to send information over a communication channel. An example of a simple communication protocol adapted to voice communication is the case of a radio dispatcher talking to a mobile station. Similarly, communication protocols for digital computer network communication have many features intended to ensure reliable interchange of data over an imperfect communication channel. Thus a communication protocol is essentially the rules which allow users in a system to properly communicate between stations.

The majority of the data messaging protocols used today are "server based" protocols. Thus, stations wishing to exchange text messages or other data must first communicate with a server which acts as an intermediary station. This type of operation is often referred to as a "store and forward" operation where the sender station sends a message to the server which stores the message until such time that an intended recipient station is able to receive the message, whereupon the server then forwards the stored message to the intended recipient station. Such protocols include Simple Message Transfer Protocol (SMTP), Simple Network Paging Protocol (SNPP), Instant Messaging (IM) and Session Initiation Protocol for Instant Messaging and Presence Leveraging Extensions (SIMPLE), to name a few. These types of protocols are commonly used for transferring messages between users in a networked environment. Existing messaging systems are becoming more and more popular especially with users of wireless devices. Since messaging can be less intrusive than voice communications via phone, messaging continues to be a popular communication mode in small business, government and corporate environments.

One problem associated with these preexisting protocols is that they cannot communicate device-to-device and must rely on system infrastructure to convey message traffic. Additionally, preexisting protocols are relatively large and complex having many bulky fields to send and receive data traffic. These types of protocols are complicated to use especially in mobile environments. Thus, the need exists for a new text messaging service protocol for limiting the number of bytes used to transmit control information and text messaging on communication links having a low data rate.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
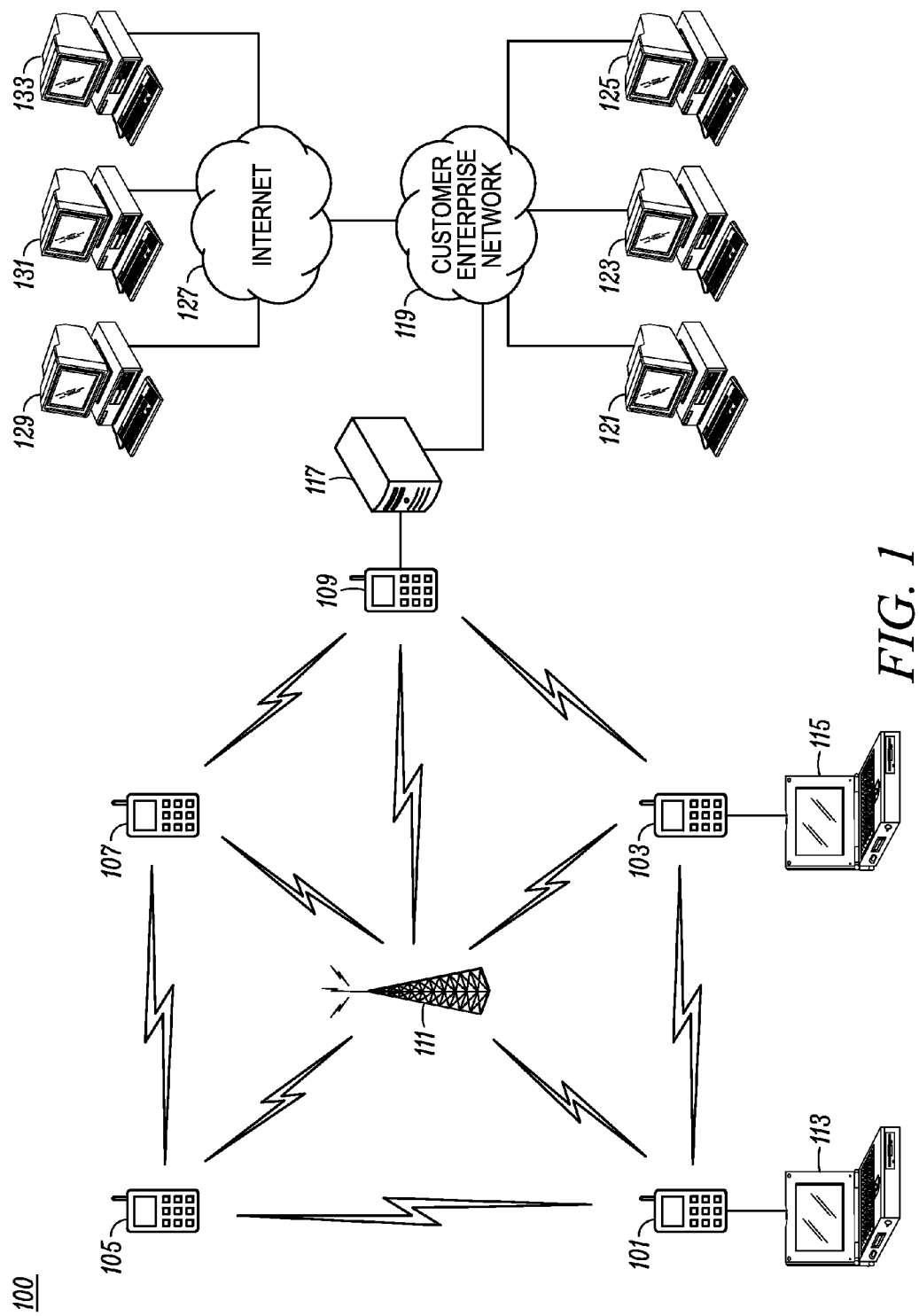
FIG. 1 is a block diagram illustrating a system level topology for use with an expandable text messaging service protocol in accordance with an embodiment of the present invention.

Before describing in detail embodiments that are in accordance with the present invention, it should be observed that the embodiments reside primarily in combinations of method steps and apparatus components related to a method and apparatus for an expandable text messaging service protocol for use in a two-way radio system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for an expandable text messaging service protocol for use in a two-way radio system described herein. The non-processor circuits may include, but are not limited to, a radio receiver, a radio transmitter and user input devices. As such, these functions may be interpreted as steps of a method to perform the expandable text messaging service protocol for use in a two-way radio system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment of the present invention can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a block diagram illustrating a system topology for use with a text messaging service protocol in accordance with an embodiment of the invention. The system 100 includes a plurality of mobile wireless devices 101-107 (also referred to herein as subscribers) that may communicate directly between each device 101-107 or through a central station such as a repeater 111. These devices 101-107 typically are two-way radio transceivers which are capable of sending voice, data traffic and/or control information wirelessly between devices. Devices 101, 103 include an external processing device 113, 115 which may be a portable laptop computer, personal digital assistant (PDA) or other electronic device capable of transmitting and receiving data and/or other messaging information to a device 101, 103. Each of the external processing devices 113, 115 are connected either physically or wirelessly to device 101, 103. The external processing devices 113, 115 utilize text messaging applications that are similar to that resident in devices 105, 107, but external processing devices 113, 115 communicate with other network devices described herein through the devices 101, 103. Hence, devices 101, 103 act as a modem in order to facilitate a communications link for the external processing device 113, 115. Alternatively, devices 101, 103 may host a text message application like that of devices 105, 107 where the text message applications hosted on devices 101, 103 and the text message applications hosted in the external processing devices 113, 115 are each addressed with a unique Internet Protocol (IP) address.

A device 109 is attached to a computer server 117 for facilitating communication between devices 101-107 and an external customer enterprise network 119, wherein the server also facilitates unit-to-unit communication. Usually, device 109 does not have a resident text messaging application similar to that resident in device 105, 107. However, in some embodiments, device 109 may likewise include the text messaging application. In one application, the server may provide a store and forward operation as described above. The customer enterprise network 119 includes a plurality of communication devices 121-125 for transmitting and receiving data and/or other messaging information through the server 117 to any of the devices 101-107 and to external processing devices 113, 115. The customer enterprise network 119 also includes connection to the Internet 127 where communications devices 129-133 may also send or receive data or other messaging information through server 117 to devices 101-107 and external processing devices 113, 115.

Figure 2:
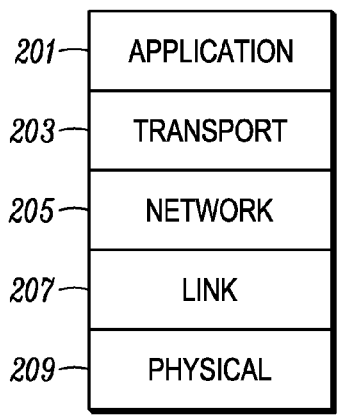
FIG. 2 is block diagram illustrating an overview of a generalized communication protocol stack as used in embodiments of the present invention.

FIG. 2 is a block diagram illustrating an overview of a generalized communication protocol stack 200 that defines a framework for communication between two devices in system 100, for example text message communication in accordance with embodiments of the present invention. In this embodiment, protocol stack 200 comprises an application layer protocol 201, a transport layer protocol 203, a network layer protocol 205, a link layer protocol 207 and a physical layer protocol 209. Those skilled in the art will recognize the operation and utility of such protocol layers and, thus, no further description of these layers will be provided for the sake of brevity.

Figure 3:
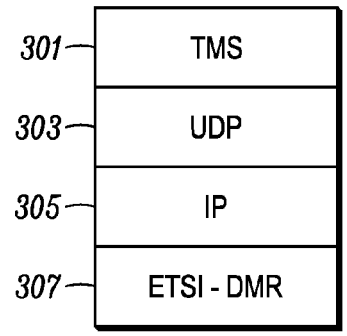
FIG. 3 is a block diagram illustrating the communication protocol stack as shown in FIG. 2 using an ETSI-DMR standard air interface and the text messaging service protocol embodiments of the present invention.

FIG. 3 is a block diagram illustrating the communication protocol stack as shown in FIG. 2 using the European Telecommunications Standards Institute-Digital Mobile Radio (ETSI-DMR) standard air interface to implement one of the protocols in the stack. The ETSI-DMR standard is defined in ETSI Technical Specification 102 361. The protocol stack shown in FIG. 3 is labeled as communication protocol stack 300. Communication protocol stack 300 includes four protocols, which includes a Text Message Service (TMS) protocol 301 in accordance with the teachings herein, with the TMS protocol comprising the application layer protocol 201. As an application layer protocol, the TMS protocol 301 interfaces directly to and performs common application services for application processes running on a device. Protocol stack 300 further comprises a User Datagram Protocol (UDP) protocol 303 that comprises the transport layer protocol 203, an IP protocol 305 that comprises the network layer protocol 205 and an ETSI-DMR protocol 307, which comprises both the link layer protocol 207 and the physical layer protocol 209. Protocols 303, 305 and 307 are well known in the art and will not be further discussed for the sake of brevity. Moreover, those skilled in the art will recognize that each "layer" adds several fields comprising a header for that protocol layer. In addition, although UDP and IP are not required by the ETSI standard, the present invention supports such an implementation.

Figure 4:
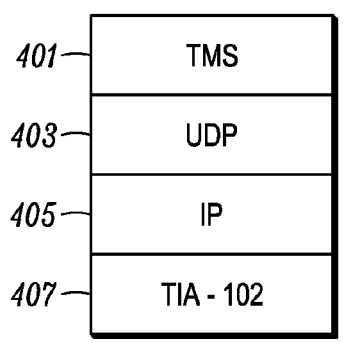
FIG. 4 is a block diagram illustrating the communication protocol stack as shown in FIG. 2 using a TIA-102 standard air interface and the text messaging service protocol embodiments of the present invention.

Similarly, FIG. 4 is a block diagram illustrating the communication protocol stack as shown in FIG. 2 using the Telecommunications Industry Association-102 (TIA-102) standard air interface to implement one of the protocols in the stack. The protocol stack shown in FIG. 4 is labeled as communication protocol stack 400. Communication protocol stack 400 also includes four protocols, namely, a TMS protocol 401 in accordance with the teachings herein, a UDP protocol 403, an IP protocol 405 and a TIA-102 protocol 407. TMS protocol 401, UDP protocol 403 and IP protocol 405 are the same as those identically named protocols 301, 303 and 305 described above, and as relates to the layers in the protocol stack 200. However, in this implementation the well known TIA-102 protocol 407 comprises both the link layer protocol 207 and the physical layer protocol 209.

Figure 5:
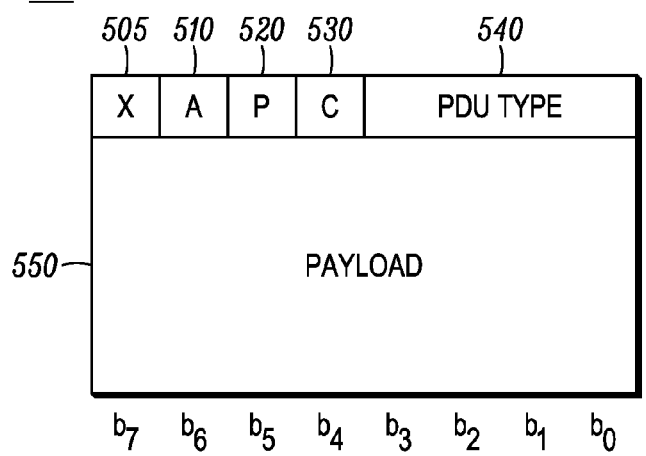
FIG. 5 is a block diagram illustrating a structure of a text messaging service message in accordance with an embodiment of the present invention.

FIG. 5 is a block diagram illustrating a general structure of a text messaging service message 500 in accordance with an embodiment of the present invention. Text messaging service message (also referred to herein as a TMS protocol data unit (PDU)) 500 includes a header portion comprising fields 505-540 and may include a payload portion 550 depending on the particular type of PDU being sent. As seen in the diagram, bit slots $b_0$-$b_7$ each designate one bit length and comprise an octet. The header portion includes a header extension field 505, an acknowledgment field 510, a priority field 520, a control bit field 530 and a PDU type field 540. The header extension (X) field 505 is a one-bit field that is in the bit position, $b_7$, and is used for expanding the header as necessary for including additional protocol information. For purposes of the teachings herein, expanding the header means that the header includes additional octets or, in other words, that the text messaging service message comprises additional headers. Thus, the message having an "expandable header" means that the message may comprise one or more headers depending on the setting of one or more header extension fields 505. The acknowledgment (A) field 510 is a one-bit field used for indicating that an acknowledgment message is required from a receiving device. However, if the message type is an acknowledgement message, then this indicates a negative acknowledgment (NACK) when this field is set.

The priority (P) field 520 is a one-bit field that works to flag the message as a priority-based communication. The control bit (C) field 530 is a one-bit field used to designate either control or user-based information (or in other words whether the TMS PDU is a control message or a user message). The PDU type field 540 is a four-bit field used to designate one of sixteen types of PDUs used in the protocol. This may include such message types as acknowledgment, text message or service availability message. In an embodiment, the control bit field 530 is used in combination with the PDU type field 540 to designate one of the available PDUs used in the protocol. Accordingly, there may be up to sixteen types of user messages and up to sixteen types of control messages. The payload field 550 is used to group payload information for any of these various message types.

Figure 6:
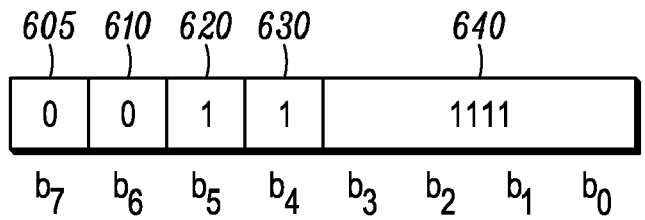
FIG. 6 is a block diagram illustrating the composition of an acknowledgment message, in accordance with an embodiment of the present invention.

FIG. 6 is a block diagram illustrating an example of the composition of a first type of acknowledgment message 600, in accordance with an embodiment of the present invention. In this and the following examples, an active command is referred to as a logical "1" while a clear command is referred to as a logical "0." However, these commands may be reversed without departing from the scope of the teachings herein, such that an active command is a logical "0" and a clear command is a logical "1". The acknowledgment message 600 is illustrated with an extension field 605 and acknowledgment field 610 both set to "0" indicating no extension or acknowledgment. A priority bit field 620 and a control bit field 630 are both set to "1" indicating these fields are active. In operation, the control bit field 630 and a PDU field 640 (1111) are used in combination to indicate that this is an acknowledgment message.

Figure 7:
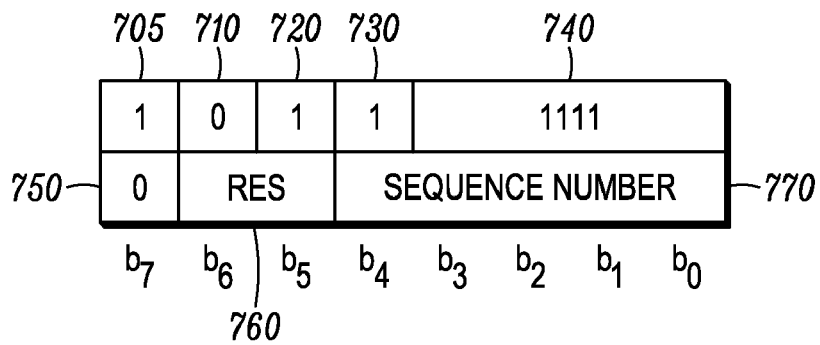
FIG. 7 is a block diagram illustrating an acknowledgment message using one extension bit for creating one additional header, in accordance with an embodiment of the present invention.

Similarly, FIG. 7 is a block diagram illustrating a second example of an acknowledgment message 700 using one extension bit for creating an additional header, in accordance with an embodiment of the present invention. In contrast to FIG. 6, FIG. 7 is illustrated with an extension bit field 705 set to "1" so as to indicate that there is at least one additional header. An acknowledgment field 710 is set to "0" while a priority field 720 and a control bit field 730 are both set to "1" indicating they are active. In operation, the control bit 730 and a PDU-type field 740 (1111) are used in combination to indicate that the message is an acknowledgment message. A second header in the acknowledgment message is illustrated such that a second extension bit field 750 is set to "0," indicating that no additional headers will follow. A reserved field 760 is a two-bit field reserved for future protocol enhancements. A sequence number field 770 is a five-bit field that is used in connection with a transmit sequence number so that a specific transmitted message can be acknowledged.

Figure 8:
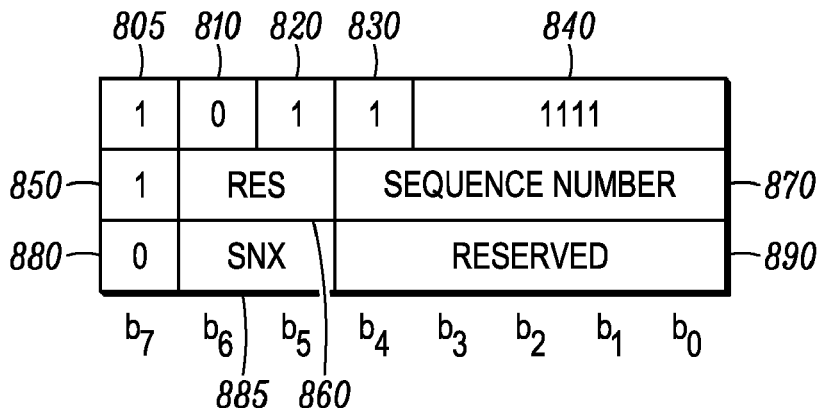
FIG. 8 is a block diagram illustrating an acknowledgment message using two extension bits for creating two additional headers, in accordance with an embodiment of the present invention.

FIG. 8 is a block diagram illustrating a third example of an acknowledgment message 800 using two extension bits for creating two additional headers, in accordance with an embodiment of the present invention. Similar to the message shown in FIG. 7, an extension bit field 805 is set to "1." An acknowledgment field 810 is set to "0" while a priority bit field 820 and control bit field 830 are both set to "1." A PDU type field 840 indicates that the message is an acknowledgment message. In operation, the control bit field 830 and the PDU field 840 are used in combination to indicate that the message is an acknowledgment message. Since an extension bit field 850 in a second header is set to "1," this indicates that an additional (third) header will follow the second header. The second header also includes a reserved field 860 and a sequence number field 870 as indicated in FIG. 7. An extension bit field 880 in a third header is set to "0". A sequence number extension field 885 is a two-bit field and can be used for adding two additional bits when a seven digit bit sequence number is required for acknowledgment purpose. This extension field 885 contains the most significant bits of the combined sequence number (SN) and sequence number extension (SNX) fields. Finally, a second reserved field 890 is an additional five-bit field which may be used for future protocol enhancements.

Figure 9:
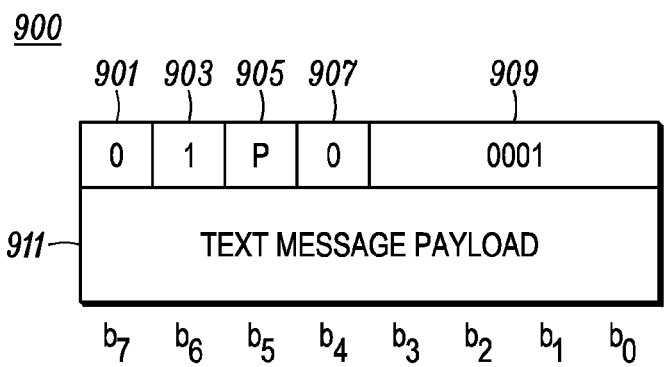
FIG. 9 is a block diagram illustrating the composition of a text message, in accordance with an embodiment of the present invention.
Figure 10:
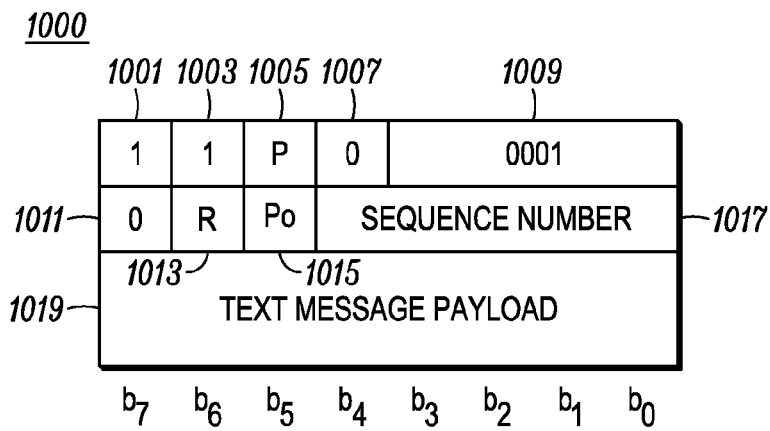
FIG. 10 is a block diagram illustrating a text message using one extension bit for creating one additional header, in accordance with an embodiment of the present invention.
Figure 11:
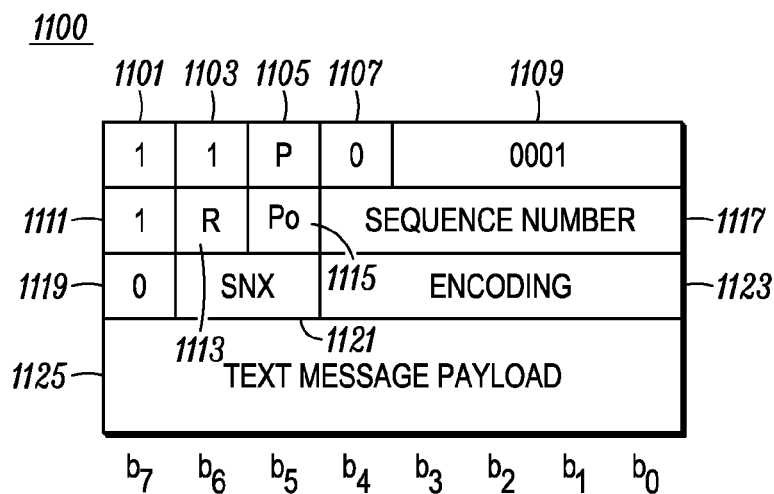
FIG. 11 is a block diagram illustrating a text message using two expansion bits for creating two additional headers, in accordance with an embodiment of the present invention.

FIGS. 9-11 are block diagrams illustrating example compositions of a text message, in accordance with embodiments of the present invention. With regard to FIG. 9, a text message 900 includes an extension bit field 901, an acknowledgment field 903, a priority field 905, a control bit field 907 and a PDU type field 909. The PDU type field 909 indicates that this message is a text message (0001). The control bit field 907 and PDU field 909 are used in combination to indicate, respectively, that the message is a user message (indicated by field 907 being set to a logical "0") and further that the user message type is a text message. A text message payload field 911 is a variable bit length field used for carrying text message payload information.

FIG. 10 is a block diagram illustrating an example composition of a text message 1000 using a one extension bit for creating one additional header. In this example, an extension bit field 1001 is set to 1 to indicate that a second header will follow the first header. An acknowledgment field 1003, a priority field 1005, a control bit field 1007 and a PDU type field 1009 are similar to that shown in FIG. 9. A second header comprises an extension bit field 1011, a receipt field 1013, a reply request or poll (Po) field 1015, a sequence number field 1017 and a text message payload field 1019. In this example, the extension bit field 1011 is set to 0 indicating there will be no additional extension headers. The receipt field 1013 is used by a sending device to request an automatic reply from the receiving device when the message is read by the user. The Po field 1015 is used by the sending device to request a response from the receiving user. The sequence number field 1017 is a five bit field that is used in connection with a transmit sequence number so that a specific transmitted message can be acknowledged or referenced.

Similarly, FIG. 11 is a block diagram illustrating a text message 1100 using two extension bits for creating two additional headers. The text message 1100, like that shown in FIG. 10, illustrates a first extension bit header 1101 set to 1 and an acknowledgment field 1103 set to 1, while a priority field 1105, a control bit field 1107, and a PDU type field 1109 are set to the same values as those in the corresponding fields in messages 900 and 1000. A second header illustrates a second extension bit field 1111 set to 1 indicating that a third header will be used. A receipt field 1113, a reply request or poll (Po) field 1115 and a sequence number field 1117 are set to the same values as those of the corresponding fields in message 1000. A third header includes an extension bit field 1113 that is set to 0 indicating that no additional headers follow. A sequence number extension bit field 1121 is used to add two additional bits to an extension header for acknowledging or referencing messages requiring a seven-bit sequence number. An encoding field 1123 indicates what type of character decoding scheme will be used by the receiving device. Finally, a text message payload field 1125 is used to convey the text message information.

Figure 12:
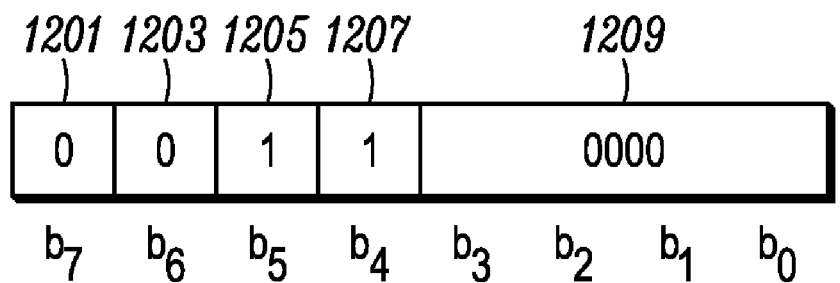
FIG. 12 is a block diagram illustrating the composition of a service availability message, in accordance with an embodiment of the present invention.

FIG. 12 is a block diagram illustrating an example of the composition of a service availability (SA) message 1200, in accordance with an embodiment of the present invention. An SA message is used for communicating with an external enterprise network and/or other devices communicating via the Internet. For example, the service availability message can be sent from server 117 to devices 105, 107, 113 and/or 115 to indicate to the mobile text message service applications in devices 105, 107 and external processing devices 113, 115 which text messaging routing services are available in the system and the internet protocol (IP) address of the server 117. This IP address is not conveyed explicitly in the messages shown in FIGS. 12 and 13. Instead, the server's IP address is determined, for example, by reading a source IP address from an IP header and a source UDP port from a UDP header, which are received at devices 105, 107, 113, 115 along with message 1200 (or 1300).

SA message 1200 is also used to prevent the mobile text message service applications from attempting transmission of a text message service message that cannot be properly routed to an intended recipient device. Use of this message preserves precious air interface bandwidth by eliminating the sending of some messages that will ultimately fail delivery. The service availability message 1200 includes an extension bit field 1201, an acknowledgment field 1203, a priority field 1205, a control bit field 1207 and a PDU type field. In this example, the control bit field 1207 and the PDU-type field 1209 indicate, respectively, that the message is a control message and further that the control message type is a service availability message (0000). Message 1200 can be used, for example, where the routing capabilities are known by the devices in the system a priori to receiving message 1200 for instance through provisioning in the device.

Figure 13:
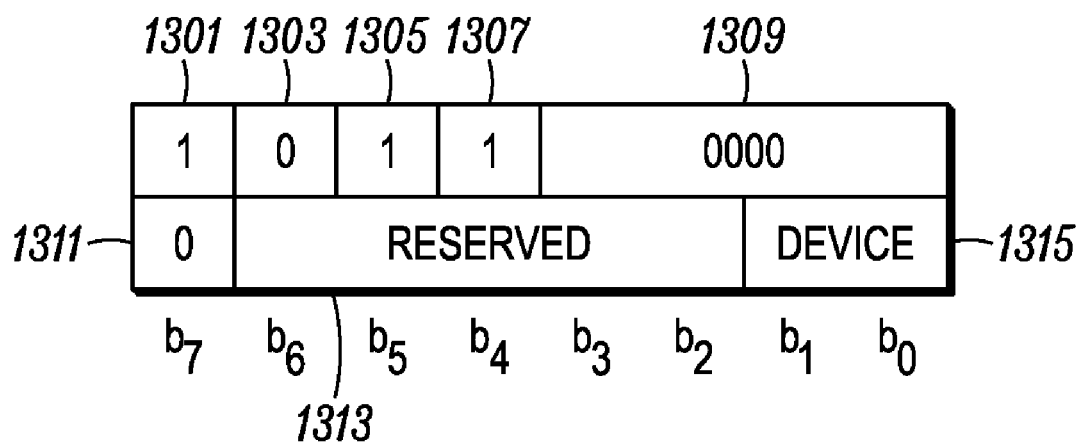
FIG. 13 is a block diagram illustrating a service availability message with one extension bit for creating one additional header, in accordance with an embodiment of the present invention.

FIG. 13 is a block diagram illustrating a second example of a service availability message 1300 with one extension bit for creating one additional header, in accordance with an embodiment of the present invention. The service availability message 1300 is illustrated with a first extension bit 1301 set to 1 which indicates that a second header will follow. An acknowledgment bit field 1303, a priority bit field 1305, a control bit field 1307 and a PDU type field 1309 are set to the same values as the corresponding fields in message 1200. A second header includes a second extension bit field 1311 set to 0, indicating that no further extension headers will follow. A reserved field 1313 is used for future control information, while a device field 1315 is a two bit field used to indicate which type of services are available at the server. An alternative way to view this field (based on the implementation below) is that this field indicates those devices that are able to perform text message communications within the network and further indicates whether use of the text message server is needed to enable such communications.

As used with respect to the teachings described herein, the term "Limited" means that text messages may be sent between subscribers and between subscribers and external processing devices directly without use of a text message server (e.g., the server 117). In this case the destination IP address used is that of the target device (subscriber or external processing device). Text messages may also be sent between subscribers and dispatchers. In this case the destination IP address is that of the server 117, which is obtained by reading the source IP address from the IP header when a service availability message is received (or it could be provisioned into the subscriber).

The term "Internal" means that text messages may be sent between subscribers and between subscribers and external processing devices and between subscribers and dispatchers with use of a text message server (also referred to herein as store-and-forward). In this case the destination IP address used is that of the server 117, which is obtained by reading the source IP address from the IP header when the service availability message is received (or it could be provisioned into the subscriber).

The term "Email" means that text messages may be sent between subscribers and between subscribers and external processing devices directly without use of a text message server. In this case the destination IP address used is that of the target device (subscriber or external processing device). Text messages may also be sent between subscribers and dispatchers and between subscribers and email clients. In this case the destination IP address is that of the server 117, which is obtained by reading the source IP address from the IP header when the service availability message is received (or it could be provisioned into the subscriber).

Finally, the term "Full" means that text messages may be sent between subscribers and between subscribers and external processing devices and between subscribers and dispatchers and between subscribers and email clients with use of a text message server (store-and-forward). In this case the destination IP address used is that of the server 117, which is obtained by reading the source IP address from the IP header when the service availability message is received (or it could be provisioned into the subscriber).

Table 1 below represents exemplary allowed/supported capabilities for a text message server (e.g., the server 117) in accordance with an embodiment of the present invention. It should be further noticed with respect to Table 1 that for the situation where there is no SA message received from the server 117, text message service to dispatcher is supported when the server IP address is provisioned in the subscriber. Otherwise it is not supported until a service availability message is received.

TABLE 1

| | Allowed/Supported Capabilities | | | |
|---|---|---|---|---|
| | SU—SU via Direct (no S&F) | SU—SU via Server (S&F) | Dispatcher via Server (S&F) | Email via Server (S&F) |
| No Service Availability Message Received - One Embodiment | YES | NO | MAYBE | NO |
| No Service Availability Message Received - Alternative Embodiment | NO | NO | NO | NO |
| Limited | YES | NO | YES | NO |
| Internal | NO | YES | YES | NO |
| E-Mail | YES | NO | YES | YES |
| Full | NO | YES | YES | YES |

As stated earlier, FIGS. 12-13 illustrate structures for text message service (TMS) service availability messages that are sent from a TMS server (e.g., the server 117) to announce TMS availability on the system. The device field 1315 is used to uniquely identify the capabilities at the TMS server, which include limited routing, internal routing, email routing or full routing. Thus, the use of this protocol can prevent the generation of messages that are not supported on a particular system. As used in the system, the limited routing capability is the basic text messaging routing that is enabled (e.g., to default devices such as mobile and portable subscribers and dispatchers on the network). The internal routing capability is text messaging routing to devices on the internal network that is supported using a store and forward service (e.g., mobile and portable subscribers and dispatchers). The email routing capability is the text messaging routing to devices on external networks having the necessary support (e.g., limited routing capability plus email address routing capability). Finally, the full routing capability is the indication that the server is capable of routing to all devices (e.g., internal routing capability plus email address routing capability).

Accordingly, embodiments of the invention provides that upon reception of the service availability message, the mobile and portable subscribers will be aware of the TMS server functionality deployed in the system, and dynamically configure text message parameters accordingly. In one system implementation, limited routing capability is assumed until the TMS service availability message is received. In another system implementation, no routing capability is assumed until the TMS service availability message is received.

Figure 14:
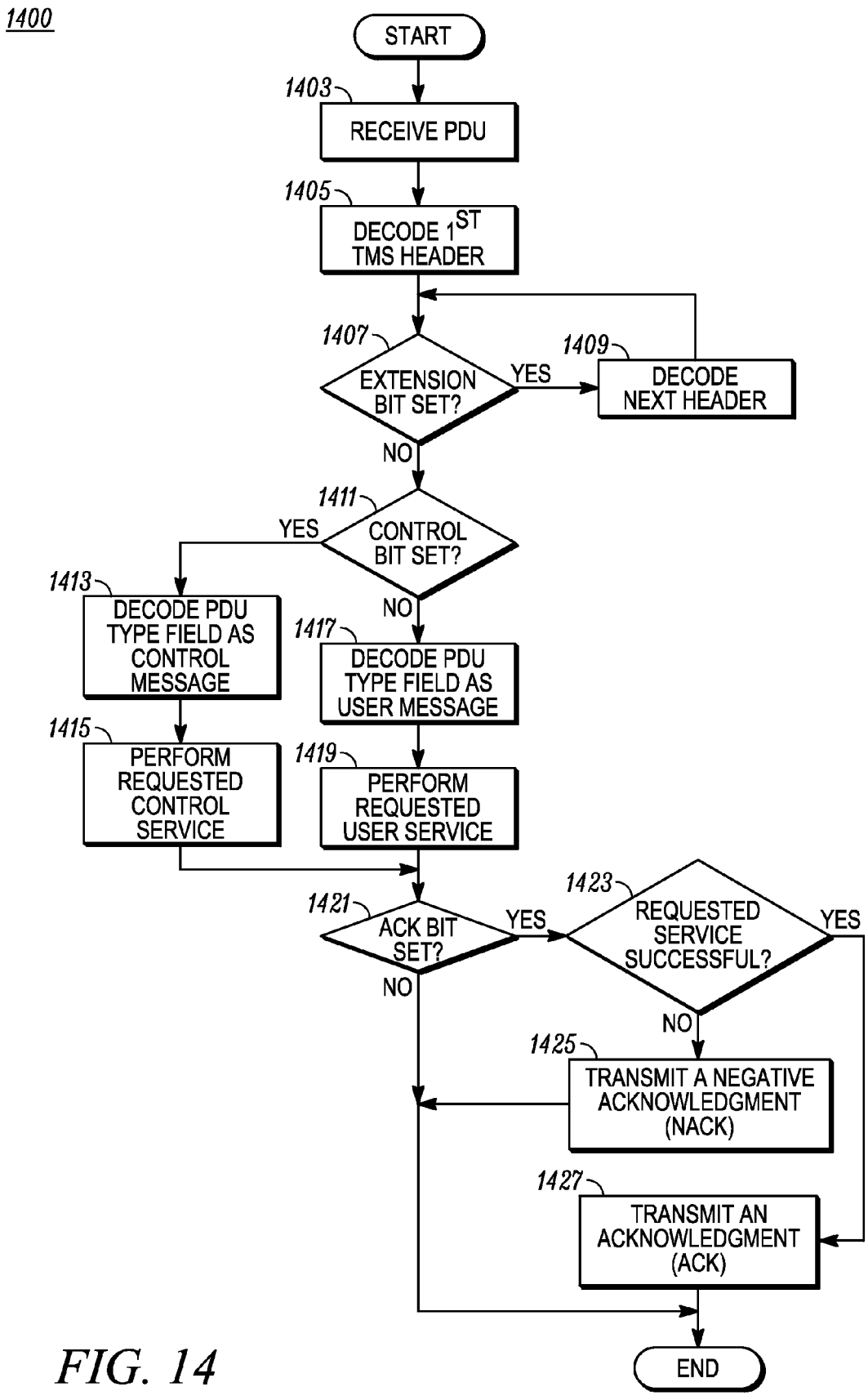
FIG. 14 is a flow diagram illustrating a method for receiving a message, in accordance with an embodiment of the present invention.

FIG. 14 is a flow diagram illustrating an exemplary method 1400 for receiving a message in accordance with an embodiment of the present invention. It should be noted that the order of the steps in any of the methods described herein does not imply a strict order since the order of the steps may be changed without departing from the teachings herein. At a step 1403, a receiving device receives a message (e.g., a PDU) from a sending device. The receiving device detects that the message was received at a predetermined port at the receiving device indicating that the message is a TMS PDU having at least a first header in accordance with the teachings herein. Port, as used herein, refers to an endpoint to a logical connection. A port can be, for example, any suitable transport layer port such as a TCP/IP (transport control protocol/internet protocol) port or a UDP port. In one embodiment, the predetermined port is UDP port 4007. Upon detecting that the received message is a TMS PDU, the receiving device then begins to decode (1405) the first message header, and further decodes any additional headers and a payload field (if present) in accordance with the remaining steps of method 1400.

At a step 1407, the receiving device detects or determines whether a bit is set (e.g., 1) in an extension bit field in the first header. If the extension bit is set, a next header is also decoded (1409) and this process is continued until no further headers are present as indicated by an extension bit that is not set (e.g., 0). At a step 1411, the receiving device determines whether a control bit is set in the control bit field of the header. If the control bit is set, then the PDU type field is decoded (1413) and identified as a particular control message type and an associated control service or action (if any) is performed (1415). For example, where a TMS SA message is received, the control service or action (1415) may be to locally store an indication of the service capability communicated in the message. Exemplary PDU type values when the control bit is set comprise: "0000" indicating a TMS SA message as described above; "0001" indicating a TMS receiver actions message; and "1111" indicating a TMS acknowledgement message as described above. One example of a receiver actions message is a message associated with an embedded poll response. In such an implementation, the user sends a message with embedded poll response (e.g., yes/no). The receiver actions message is used to return the actual response to the initiator. Thus, the receiver actions message can be used by a receiving device to perform subsequent handling of a message it received (beyond an acknowledgement).

On the other and, if the control bit is not set, the PDU type field is decoded (1417) and identified as a particular type of user message and a user service (if any) is performed (1419) as requested. For example, where the receipt (R) field is set, the receiving device automatically sends a reply message when the payload is read by a user of the receiving device. Exemplary PDU type values when the control bit is not set comprise: "0000" indicating simple text message; "0001" indicating a simple text message with embedded poll response; and "1111" indicating a canned (or predefined) message.

Further, at a step 1421 the receiving device determines whether the acknowledgment bit in the first header is set. If this bit is not set, then the process ends. Otherwise, if the acknowledgment bit is set, the receiving device transmits an acknowledgment message to the sending device. In one case, the acknowledgement message that is transmitted (1427) is a positive acknowledgement (ACK) such as where the receiving device successfully performs (1423) a requested service. Alternatively, the acknowledgement message that is transmitted (1425) is a negative acknowledgement (NACK) such as where the receiving device fails to successfully perform (1423) a requested service. In one exemplary implementation, the NACK is an acknowledgement message with the ACK bit field set to 1 when the PDU field type indicates that the TMS PDS is an acknowledgement message.

Figure 15:
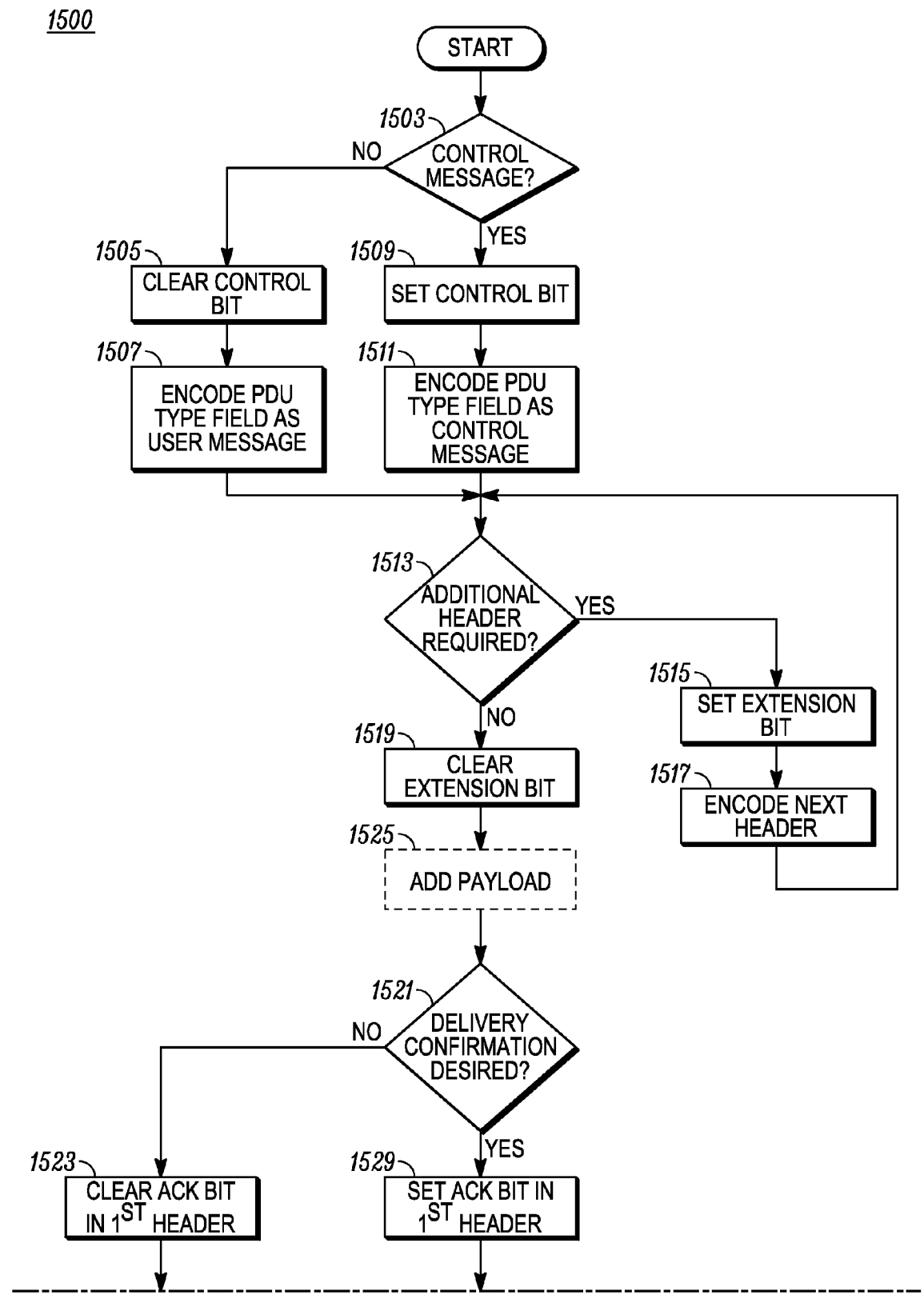
FIG. 15 is a flow diagram illustrating a method for transmitting a message, in accordance with an embodiment of the present invention.

FIG. 15 is a flow diagram illustrating an exemplary method 1500 for transmitting a TMS PDU in accordance with an embodiment of the present invention. The PDU comprises at least one header in accordance with the above teachings, which includes at least an extension bit field, a control bit field and a PDU type field as described above. Accordingly, at a step 1503 a transmitting device determines that the message is either a control or a user message. If the PDU is not a control message, the control bit is cleared (1505), and the PDU type is encoded (1507) as a particular type of user message. Exemplary user message values are as described above. If a control message is to be sent, the control bit is set (1509), and the PDU type is encoded (1511) as a particular type of control message. Exemplary control message types are as described above.

If at a step 1513 the transmitting device determines that an additional header is required, the extension bit is set (1515) and the next header is encoded (1517). Steps 1513 through 1517 are repeated until no further additional headers are required. At that point, the extension bit in the final header is cleared (1519). At a step 1525, a payload field with payload information is optionally added as needed or required. At a step 1521, the transmitting device determines whether a delivery confirmation is desired. If no delivery confirmation is desired, the ACK bit is cleared (1523) in the ACK field of the first header. However, if a delivery confirmation is desired, the ACK bit in the ACK field of first header is set (1529).

Figure 16:
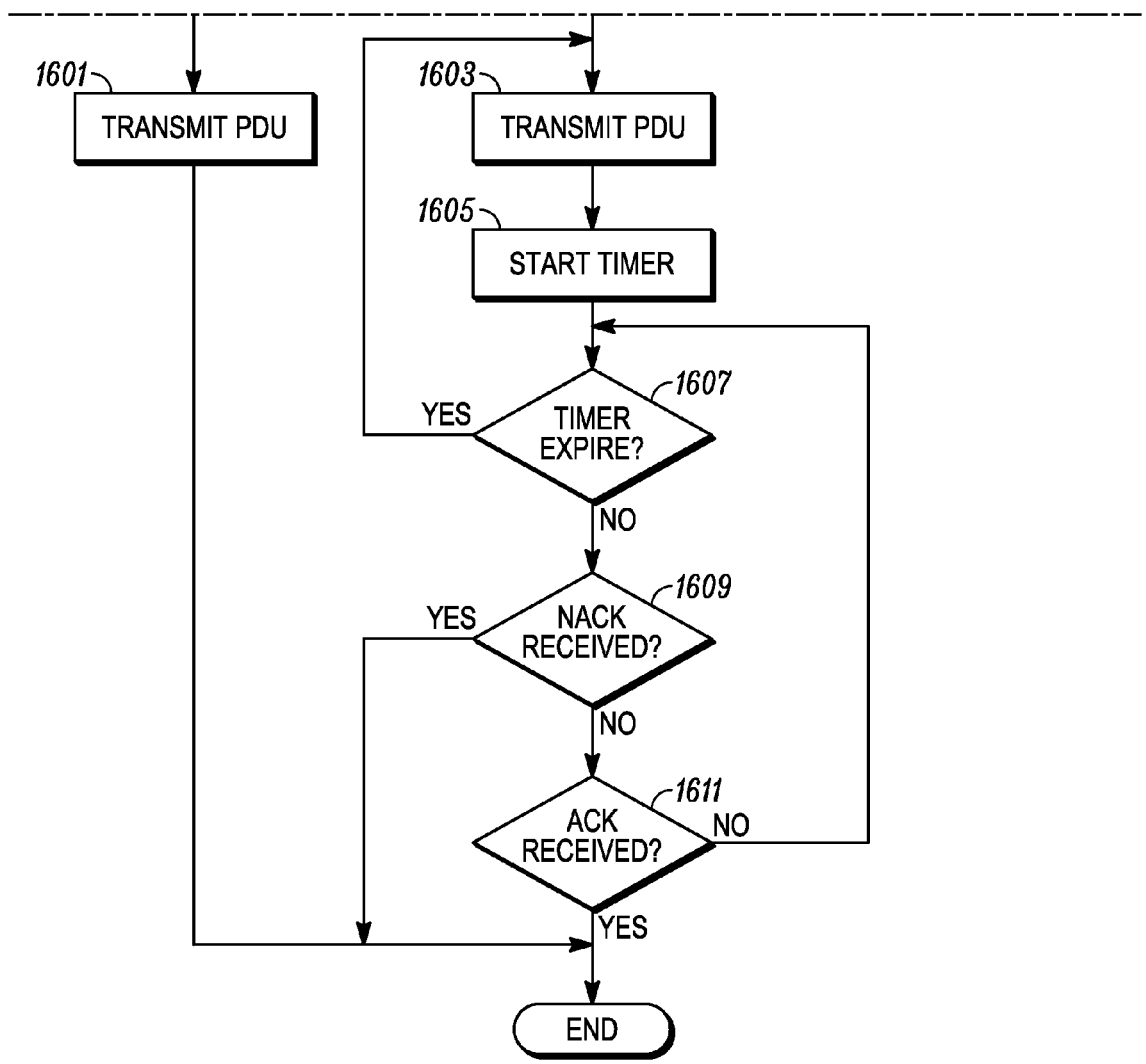
FIG. 16 is a continuation of the flow diagram started in FIG. 15.

FIG. 16 continues the transmit process embodied in method 1500. Where the ACK bit in the first header is clear, transmission of the PDU proceeds at step 1601 and the process ends. However, where the ACK bit in the first header is set, transmission proceeds at a step 1603. In either case, transmitting the PDU may comprise, for example, performing the methods described by reference to FIGS. 18 and 19. As will be seen, in accordance with those implementations "transmitting" the PDU may include the transmitting device determining (as a result of decoding an SA message) that a PDU destined to a particular device should not be transmitted because it cannot be delivered based on the status of the text messaging service availability at that time. In many other instances "transmitting" means that the transmitting device actually sends or forwards the PDU toward the intended receiving device.

Turning back to step 1603, where the PDU is actually sent from the transmitting device toward an intended receiving device and the transmitting device expects an acknowledgement message, in one embodiment the transmitting device starts a timer (1605) and monitors (1607) the timer to determine whether it has expired, whereupon the transmitting device resends the PDU. If the timer has not expired and a NACK is received (1609), then the process ends. Similarly, if the timer has not expired and an ACK is received (1611), then the process ends. In a typical scenario, the number of transmission retries is limited so that the process does not enter into an infinite loop when no ACK or NACK is received. Moreover, where the transmitting device actually sends the PDU, it is transmitted from a port in the transmitting device to a predetermined port in the receiving device (as described above). The port in the transmitting device can be a transport layer port such as a TCP/IP port or a UDP port. For example, where the transmitting device is a subscriber, the port in one embodiment is a UDP port 4007, and where the transmitting device is an external processing device such as a personal computer, the port can be any ephemeral port. An ephemeral port as used herein has a port number that is automatically allocated from a predefined range of port numbers.

Figure 17:
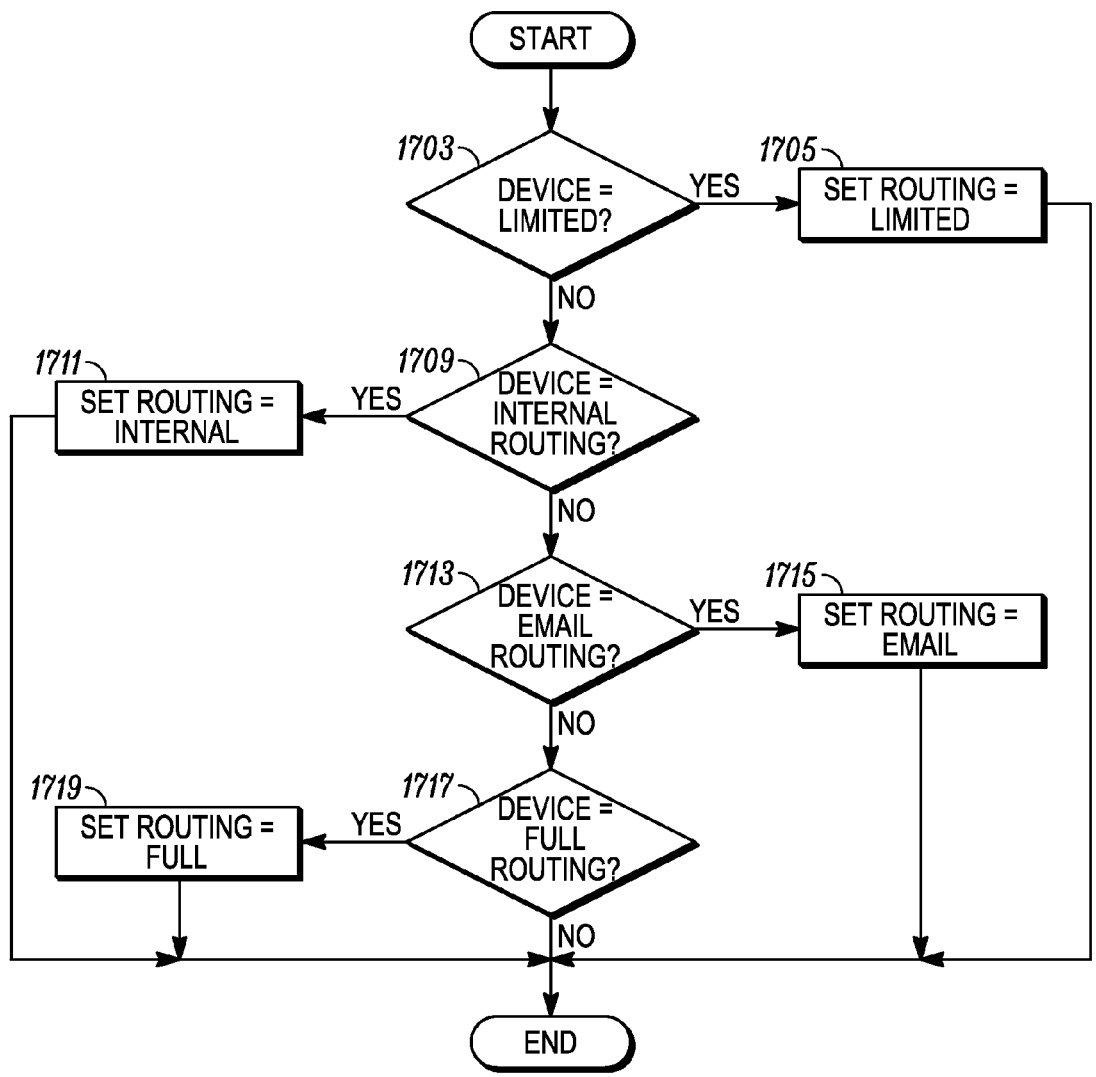
FIG. 17 is a flow diagram illustrating a method used by a receiver for processing a service availability message, in accordance with an embodiment of the present invention.

FIG. 17 is a flow diagram illustrating a method 1700 used by a receiving for processing a service availability message, in accordance with an embodiment of the present invention. As set forth in this process, a series of determinations are made based on the value of the device field 1315 (see FIG. 13) in a received service availability message. A determination (1703) is made if the system provides limited routing capabilities, and if limited routing capabilities are present a "routing variable" is set to limited (1705) and the process ends. For example, in one exemplary implementation the routing variable could be locally storing the routing capabilities information communicated in the service availability message, in any suitable format such as a Random Access Memory, so that the routing information is accessible when needed.

If the system routing capability is not limited, the device determines (1709) whether the system supports internal routing, and the routing variable is set to internal routing (1711) and the process then ends. If the system has no internal routing, then a determination (1713) is made if the system has email routing. If the system does have email routing, the routing variable is set to email (1715) and the process ends. If the system has no email routing, then a determination (1717) is made if the system has a full routing capability. If the system does have full routing capability, the routing variable is set to full (1719) and the process ends. If, however, no full routing is associated with the device, then the process ends without setting the routing variable. Moreover, when a service availability message is received, the resident text message application reads the source IP address from the IP header and uses that IP address as the destination IP address for subsequent server-based (e.g., dispatcher, email, subscriber-to-subscriber via store-and-forward, etc.) text messaging.

Figure 18:
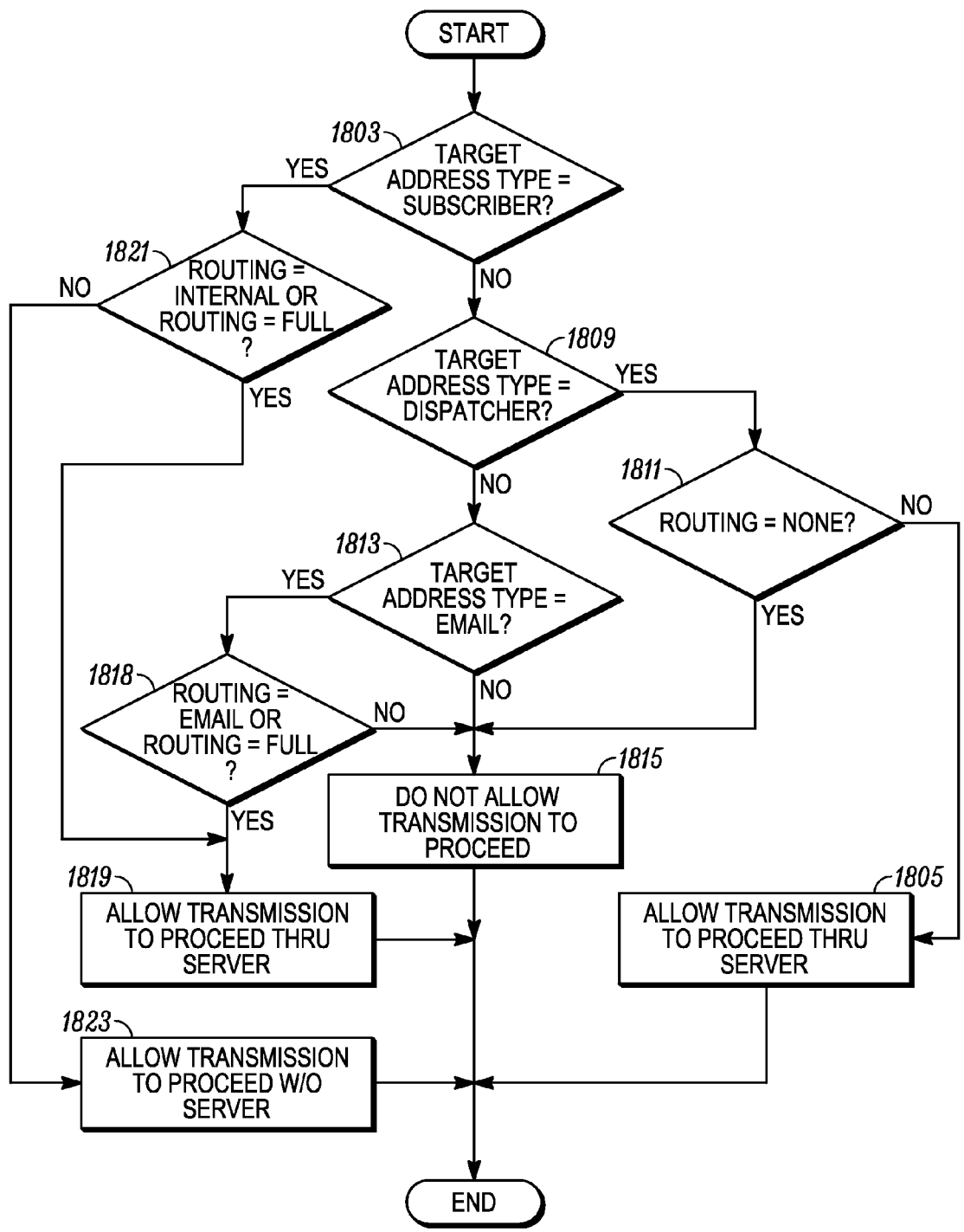
FIG. 18 is a flow diagram illustrating a method for transmitting protocol data units for a message transmission which does not require a server to process a subscriber-to-subscriber text message, in accordance with an embodiment of the present invention.

FIG. 18 is a flow diagram illustrating a method 1800 for transmitting TMS PDUs, in accordance with an embodiment of the present invention, when a message transmission is requested by a resident text message application for a mode which does not require a server to process subscriber-to-subscriber text messages. The example as described herein is directed to a conventional mode (which does not employ a fixed end data system) such as, for instance, a conventional (non-trunked) radio system. A subscriber unit may operate either in a talkaround mode (subscriber-to-subscriber without the assistance of a repeater) or repeater mode (subscriber-to-subscriber with the assistance of a repeater). Method 1800 applies to both the talkaround mode and the repeater mode where a server (e.g., server 117) is not required to process the subscriber-to-subscriber message.

At a decision step 1803, if a target address type is that of a subscriber then a further determination (1821) is made if the routing capability variable is set to internal or full. As described above, the service availability in the system is announced via a service availability message that indicates to the receiving devices the type of routing that is supported by the server, e.g., the server 117 as illustrated in FIG. 1. The subscriber remembers, locally, the routing services that were announced by the system along with the IP address of the server 117. As described in FIG. 18 and FIG. 19 herein, the subscriber screens the intended transmissions before they are actually transmitted and blocks those which cannot be properly routed by the system server 117. If the service availability is not internal or full, then the transmission proceeds (1823) without the aid of the server 117 and the process ends. In this case, the message is directed to the IP address of the end device (e.g., subscriber 105-107, external computing device 113-115, etc.). Conversely, if the routing capability variable is set to internal or full, then the transmission proceeds (1819) through server 117, and the processes ends. In this case, the message is directed to the IP address of the server If the target address type is not a subscriber, it is determined (1809) if the target address type is a that of a remote fixed end device such as a dispatcher. If it is of type dispatcher, then a determination (1811) is made if the routing capability variable is not set to no routing. If that is the case, then the transmission proceeds (1805) through the server 117 directing the message to the IP address of the server. If the routing capability variable is set to no routing, then the transmission is not allowed to proceed (1815) and the processes ends. In the situation where the target address type is not of type dispatcher, a further determination (1813) is made if the target address is an email address. If it is an email address then it is determined (1817) if the routing capability variable is set to email or if it is set to full. If so, the transmission is processed (1819) though the server 117 (directing the message to the IP address of the server) and the process ends. If the routing capability variable is not an email address or the routing variable is not set to email or full then the transmission is not allowed to proceed (1815) and the process ends.

Figure 19:
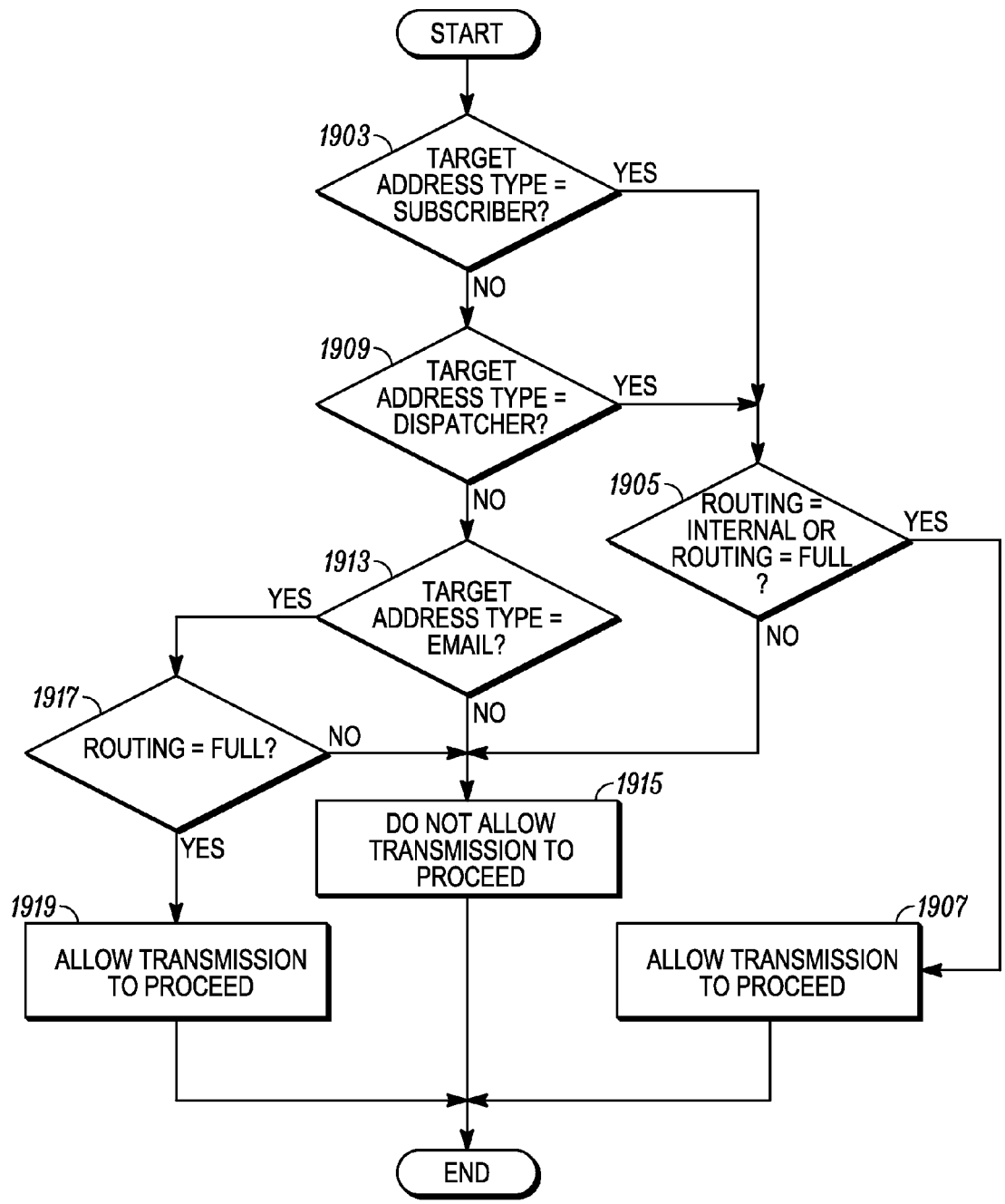
FIG. 19 is a flow diagram illustrating an alternative embodiment of a method for transmitting protocol data units for a message transmission that requires a server to process a subscriber-to-subscriber text message, in accordance with an embodiment of the present invention.

FIG. 19 is a flow diagram illustrating an alternative embodiment of the method for transmitting PDUs, in accordance with an embodiment of the present invention, when a message transmission requires a server to process subscriber-to-subscriber text messages (e.g., a store and forward type server). Being that a server is required, all messages that are allowed to proceed are directed to the IP address of the server 117. The example as described herein, is the selection of a trunked mode (talkgroup on a trunked radio system) or selected to a conventional mode, which does not employ a fixed-end data system. The subscriber unit operates in repeater mode, which uses a subscriber-to-subscriber communication with the assistance of a repeater.

At a step 1903, the transmitting device determined if a target address type is that of a subscriber. If the target address type is that of a subscriber, a further determination (1905) is made if the routing capability variable is set to internal or the routing capability variable is set to full. If this is the case, the transmission is allowed to proceed (1907) and the process ends. However, if the routing capability variable is not set to internal or full, then the process is not allowed to proceed (1915) and the process ends.

If the target address type is not that of a subscriber, then a second determination (1909) is made if the target address type is that of a dispatcher. If the target address type is that of a dispatcher, a determination (1905) is then made if the routing capability variable is set to internal or the routing capability variable is set to full. If this is the case, then the transmission is allowed to proceed (1907) through the server and the method ends. If, however, the routing capability variable is not set to internal or full, then the transmission is not allowed to proceed (1915) and the process ends.

If the target address type is not that of a dispatcher, a third determination (1913) is made if the target address type is that of an e-mail address. If the target address type is an e-mail address, a determination (1917) is made if the routing capability variable is set to full. If this is the case, then the transmission is allowed to proceed (1919) through the server and the process ends. If, however, the routing capability variable is not set to full or if the target address type is not email, then transmission is not allowed to proceed (1915) and the process ends.

Hence, mobile and portable subscribers can learn the TMS server capabilities over the air. For example, if a system has no email exchange server configured, the TMS service availability message will indicate so by the appropriate bits set. Upon initiating a text message, a subscriber will interpret the target address and compare it with the TMS service availability capability bits. In this case, it will prohibit the user from sending a text message destined to an external network device (e.g., username@domainname.com). This acts to save limited channel bandwidth from wasteful messaging. In addition, an advantage to this method is simplified network management. When a system upgrades a TMS server with external routing capability, subscribers do not need to be brought in for any control programming software (CPS) adjustments. Instead, the subscribers can receive a TMS service availability message indicating that external routing is available, and will automatically enable text messaging destined to external addresses. Another embodiment is if a peer-to-peer mode subscriber receives a TMS service availability message indicating that internal routing (store and forward service) is available, that device may then automatically switch into a server-based, radio frequency (RF) repeater mode to utilize that service.

An advantage of the protocol embodiments of the present invention is to limit the number of bytes of data to convey the information used a two-way radio transceiver. Moreover, the protocol also limit messages transmitted over the air to only those that can be properly routed in the system. The protocol uses a header extension bit at the beginning of every octet and overloading of an address field (e.g., in the additional headers). The header extension permits the transmission of additional information as needed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

We claim:

1. A method for text message communication comprising the steps of:
    creating, using an application layer protocol, a text messaging service (TMS) protocol data unit (PDU) comprising at least,
        a first header comprising at least,
            a one bit extension bit field for creating an expandable header;
            a one bit control bit field for selectively designating the message as a message type, wherein the message type is selected from a group comprising a control message and a user message; and
            a multiple bit PDU type field used in combination with the one bit control bit field for identifying a TMS PDU type from a plurality of TMS PDU types; and
    transmitting the TMS PDU from a first port in a sending device to a second port in a receiving device.

2. The method for text message communication of claim 1, wherein the PDU type field is used to identify the TMS PDU as one of an acknowledgment message, a text message and a service availability message.

3. The method for text message communication of claim 2, wherein the first header further comprises an acknowledgment (ACK) field for one of requesting an acknowledgment message from the receiving device and indicating a negative ACK (NACK) when the PDU type field identifies the TMS PDU as an acknowledgement message.

4. The method for text message communication of claim 1, wherein the sending device is a text messaging server, the method further comprising the step of setting the extension bit field to indicate that the TMS PDU further comprises a second header, wherein the second header includes at least a device field that indicates to the receiving device text messaging service capabilities at the server.

5. The method for text message communication of claim 4, wherein the device field indicates one of:
    limited routing message service;
    internal routing message service;
    email routing message service; and
    full routing message service.

6. The method for text message communication of claim 1, wherein the second port is a transport layer port.

7. The method for text message communication of claim 6, wherein the transport layer port is a UDP port 4007.

8. The method for text message communication of claim 6, wherein the first port is a transport layer port and wherein:
    when the sending device is a subscriber unit, the first port is a UDP port 4007; and
    when the sending device is a personal computer, the first port is any ephemeral UDP port.

9. The method for text message communication of claim 1, wherein the first header further comprises a priority field for indicating whether the TMS PDU is a priority message.

10. The method for text message communication of claim 1, wherein the first header further comprises a payload field for carrying message content.

11. A method for text message communication comprising the steps of:
    receiving a first message from a sending device;
    detecting that the first message was received at a predetermined port at a receiving device and responsive to the detecting, processing the first message as an application layer text messaging service (TMS) protocol data unit (PDU) comprising at least a first header, and wherein processing the TMS PDU comprises,
        detecting whether a bit is set in a one bit extension bit field in the first header indicating an expandable header;
        detecting whether a bit is set in a one bit control bit field in the first header indicating whether the first message is selectively designated as a message type, wherein the message type is selected from a group comprising a control message and a user message; and
        identifying one of a plurality of TMS PDU types using a combination of the one bit control bit field and a PDU type field in the first header; and
    performing an action based on content of the TMS PDU determined from the processing step.

12. The method for text message communication of claim 11, wherein the predetermined port is a transport layer port.

13. The method for text message communication of claim 12, wherein the transport layer port is a UDP port 4007.

14. The method for text message communication of claim 11, wherein processing the TMS PDU further comprises detecting that a bit is set in an acknowledgement (ACK) field in the first header, and performing an action of responsively sending an acknowledgement message to the sending device.

15. The method for text message communication of claim 11, wherein the sending device is a text messaging server and wherein processing the TMS PDU further comprises:
    identifying, from the control bit field, the first message as a control message; and
    identifying, from the PDU type field, the TMS PDU type as a service availability message.

16. The method for text message communication of claim 15, wherein processing the TMS PDU further comprises detecting, from the extension bit field, that the TMS PDU comprises a second header that includes at least a device field that indicates to the receiving device text messaging service capabilities at the server.

17. The method for text message communication of claim 15 further comprising the steps of:
    creating a second message comprising a TMS PDU intended for transmission to a target device;
    determining, based the device field in the second header, whether the text messaging service capabilities allow the server to deliver the second message to the target device; and
    blocking transmission of the second message upon determining that the text messaging service capabilities do not allow the server to deliver the second message to the target device.

18. A non-transitory computer-readable storage element having computer readable code stored thereon for programming a computer to perform a method for text message communication, the method comprising the step of: detecting that a first message was received at a predetermined port at a receiving device and responsive to the detecting, processing the first message as a text messaging service (TMS) protocol data unit (PDU) comprising at least a first header, and wherein processing the TMS PDU comprises, detecting whether a bit is set in an extension bit field in the first header; detecting whether a bit is set in a control bit field in the first header; and identifying a TMS PDU type from a PDU type field in the first header; and performing an action based on content of the first message determined from the processing step.

19. The non-transitory computer-readable storage element of claim 18, wherein the first message was received from a text messaging server and wherein processing the TMS PDU further comprises: identifying, from the control bit field of the first header, that the first message is a control message; identifying, from the PDU type field of the first header, that the TMS PDU type is a service availability message; detecting, from the extension bit field of the first header, that the first message comprises a second header that includes at least a device field that indicates to the receiving device text messaging service capabilities at the server.

20. The non-transitory computer-readable storage element of claim 19, the method further comprising the steps of: creating a second message intended for transmission to a target device, the second message comprising a second TMS protocol data unit that includes at least a third header comprising at least a second extension bit field; a second control bit field; and a second PDU type field; determining, based the device field in the second header, whether the text messaging service capabilities allow the server to deliver the second message to the target device; and blocking transmission of the second message upon determining that the text messaging service capabilities do not allow the server to deliver the second message to the target device.

* * * * *